July 10, 1928.

J. D. CRUMMEY ET AL 1,676,481

CONVEYER

Filed April 30, 1928

INVENTORS.
John D. Crummey
William J. Austin
Frank H. Lewis
BY Booth & Booth
ATTORNEYS Patented July 10, 1928.

1,676,481

UNITED STATES PATENT OFFICE.

JOHN D. CRUMMEY, WILLIAM J. AUSTIN, AND FRANK H. LEWIS, OF SAN JOSE, CALIFORNIA, ASSIGNORS TO BEAN SPRAY PUMP CO., OF SAN JOSE, CALIFORNIA, A CORPORATION OF CALIFORNIA.

CONVEYER.

Application filed April 30, 1928. Serial No. 274,126.

Our invention relates to conveyers of that type which comprises spaced parallel side chains and spaced parallel cross members extending between and connecting opposing corresponding links of the side chains.

The links of the chains are open frames, one end bar of which serves as the pintle which articulates in a socket formed on the other end bar of the link adjacent, said links having extending from their inner side bars a lug with which the end of the cross member is connected, usually by a slip joint, the end of the cross member either entering the lug or vice-versa.

Such a conveyer, while adapted in many arts for receiving and advancing various articles, finds one of its uses in an art to which we shall herein specially refer in order to fully disclose the nature and object of our improved conveyer.

In the marketing of fresh fruit, and in obedience to authoritative regulations concerning the removal of possibly noxious sprays, it is now necessary to treat the fruit by subjecting it to cleansing liquids and drying effects; and because of the size of the crop and the brief time within which it must be treated, it has been the endeavor to supply apparatus which will handle the fruit effectively and speedily. One essential member of such apparatus is an endless traveling conveyer to receive and carry the fruit through the treating zones; and as such treatment involves the necessity of as full exposure of the fruit from all sides as is possible, it is found that an open work conveyer of the nature above outlined is well adapted for the purpose.

It is essential, however, that the fruit, particularly those of a delicate nature, suffer no injury while lying upon the conveyer, and likewise care must be taken to preserve intact the assembly of the conveyer by guarding the cross members and their link connections against the corrosive effects of the liquids used, and to insure the security of said connections by preventing them from pulling apart under the weight of the load. To these ends our invention is directed.

Briefly stated, then, our improvement consists in covering the cross members with a cushion sheath, in practise one of rubber, and stretching the ends of the sheath to fully cover the joints which connect the links and the ends of the cross members.

From the following description taken in connection with the accompanying drawings, our improved conveyer together with its objects and advantages will more fully appear.

Figure 1:
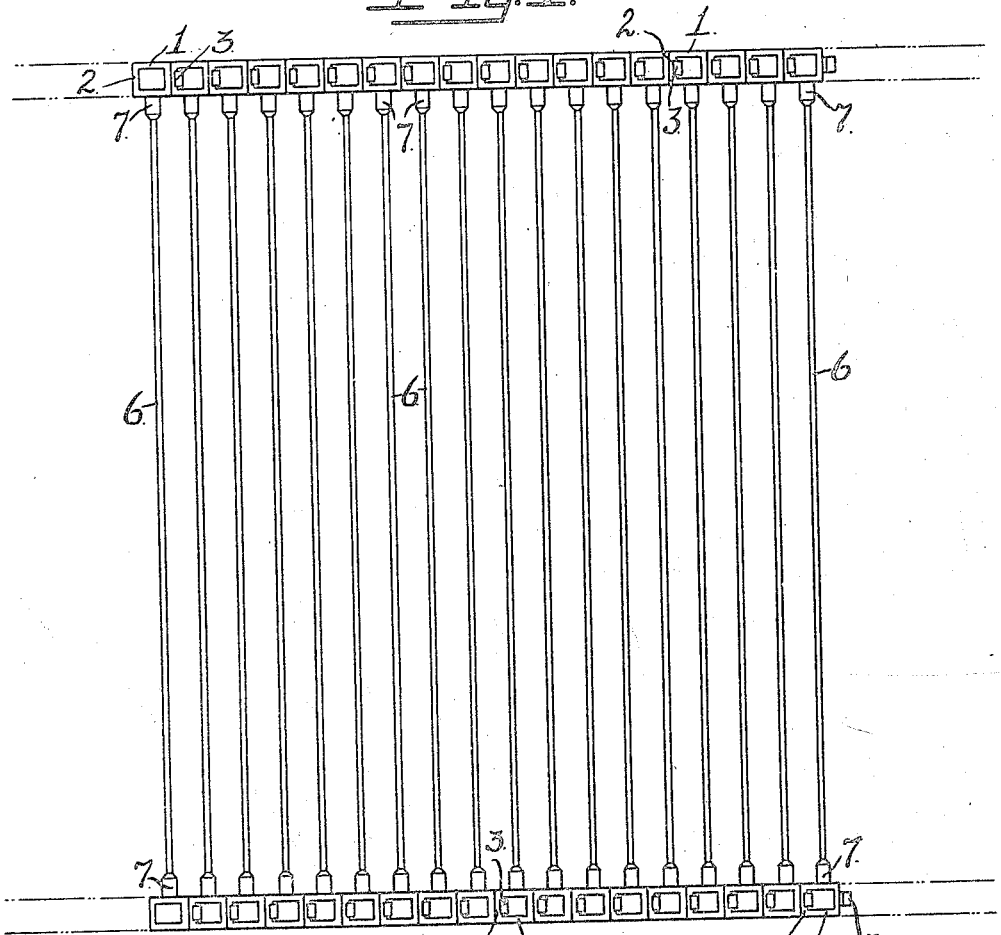

In the drawings Fig. 1 is a plan of a section of our conveyer.

Figure 2:
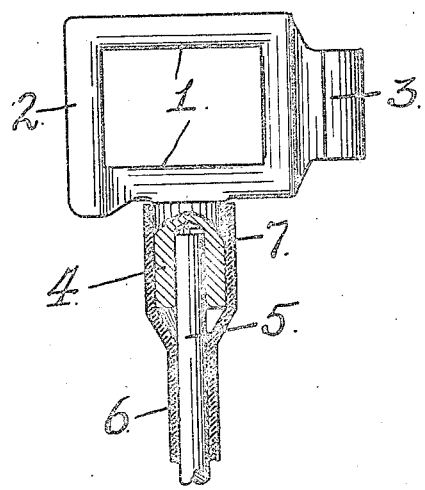

Fig. 2 is a view, enlarged, partly in plan and partly in section, of the improved cushioning and protective means of one of the cross members at one end and its joint with the link lug.

The conveyer chains are formed of links 1 consisting of open frames, one end of which forms the articulating pintle 2 and the other end is formed with the articulating socket 3. Each link is provided or formed on one side with a recessed lug 4, one of these being shown in Fig. 2. Into the lugs 4 are slip fitted the cross rods 5, one of which is shown in said Fig. 2.

Completely covering each rod 5, as shown in Fig. 1, is a rubber sheath 6, the ends 7 of the sheath being stretched over the recessed lugs 4 of the links, thus covering and sealing fully, as clearly seen in Fig. 2, the joint between said lug and the cross rod.

The rubber sheaths 6 serve to cushion the fruit and prevent injury to it. They also serve to protect the cross rods, throughout their length, from the corrosive action of the acids used in the process of cleansing the fruit. They also serve, by reason of their ends 7 stretched over and sealing the joint between the rods 5, and the link lugs 4, of guarding against the entrance of the corrosive liquids into said joints. Also by thus stretching over the lugs 4 they frictionally hold the rod ends in place in the lugs, and thereby permit said rods and sheaths to be made of small diameter to furnish maximum exposure particularly of the bottom of the fruit, as it lies upon the conveyer, said rods though small having no tendency to sag under the weight of the load, the ends of the rods being thus held in the lugs.

We claim:—

1. A conveyer comprising spaced parallel side chains composed of articulated links; spaced, parallel cross members connecting opposing corresponding links; and a rubber cushion sheath completely enveloping each cross member, the ends of said sheath being stretched to cover and bind upon the link and cross member connection.

2. A conveyer comprising spaced, parallel side chains composed of articulated links, each link having a lug projecting from one side; spaced, parallel cross members fitted to said lugs; and rubber cushion sheaths completely covering the cross members, the ends of said sheaths being stretched to cover and bind upon the joint between the link lugs and the ends of the cross members.

3. A conveyer comprising spaced, parallel side chains composed of articulated links, each link having a recessed lug projecting from one side; spaced, parallel cross rods fitting the recessed lugs of the links; and rubber cushion sheaths completely enveloping each rod throughout its length between the lugs and having its ends stretched to cover and bind upon said lugs.

In testimony whereof we have signed our names to this specification.

JOHN D. CRUMMEY.
WILLIAM J. AUSTIN.
FRANK H. LEWIS.